(12) United States Patent
MacLachlan et al.

(10) Patent No.: US 12,404,109 B2
(45) Date of Patent: Sep. 2, 2025

(54) CONVEYOR BELT AND MODULES

(71) Applicant: Laitram, L.L.C., Harahan, LA (US)

(72) Inventors: Gilbert J. MacLachlan, Harahan, LA (US); David Aaron van Schalkwijk, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 158 days.

(21) Appl. No.: 18/272,506

(22) PCT Filed: Feb. 4, 2022

(86) PCT No.: PCT/US2022/015319
§ 371 (c)(1),
(2) Date: Jul. 14, 2023

(87) PCT Pub. No.: WO2022/182497
PCT Pub. Date: Sep. 1, 2022

(65) Prior Publication Data
US 2024/0158177 A1 May 16, 2024

Related U.S. Application Data

(60) Provisional application No. 63/197,022, filed on Jun. 4, 2021, provisional application No. 63/154,289, filed on Feb. 26, 2021.

(51) Int. Cl.
*B65G 17/08* (2006.01)

(52) U.S. Cl.
CPC ........ *B65G 17/086* (2013.01); *B65G 2207/30* (2013.01)

(58) Field of Classification Search
CPC .................................................. B65G 17/086
USPC ............................................................ 198/852
See application file for complete search history.

(56) References Cited

U.S. PATENT DOCUMENTS

| | | | |
|---|---|---|---|
| 5,174,439 A | * 12/1992 | Spangler | B65G 17/086 198/852 |
| 9,573,767 B2 | 2/2017 | MacLachlan | |
| 9,663,298 B2 | * 5/2017 | MacLachlan | B65G 17/08 |
| 12,286,303 B2 | * 4/2025 | Van Faassen | B65G 17/064 |
| 2002/0179418 A1 | 12/2002 | Guldenfels | |
| 2016/0200520 A1 | 7/2016 | Menke et al. | |

FOREIGN PATENT DOCUMENTS

| | | |
|---|---|---|
| DE | 29905223 U1 | 10/1999 |
| WO | 2020187925 A1 | 9/2020 |
| WO | WO2020187925 | * 9/2020 |

* cited by examiner

*Primary Examiner* — Gene O Crawford
*Assistant Examiner* — Lester Ill Rushin
(74) *Attorney, Agent, or Firm* — James T. Cronvich

(57) ABSTRACT

A modular plastic conveyor belt constructed of injection-molded belt modules having narrowed portions either above or below rod holes in hinge elements. The narrowed portions are formed by a restricted-flow region in an injection-mold cavity that ensures that weld lines in the hinge elements are angled off the pull line of the conveyor belt.

18 Claims, 2 Drawing Sheets

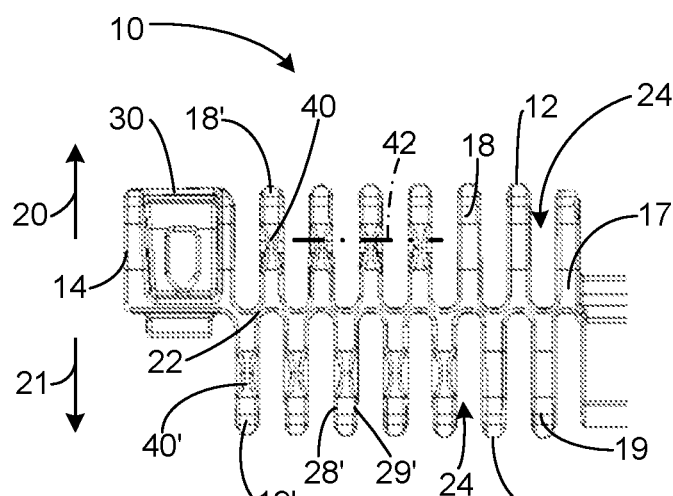
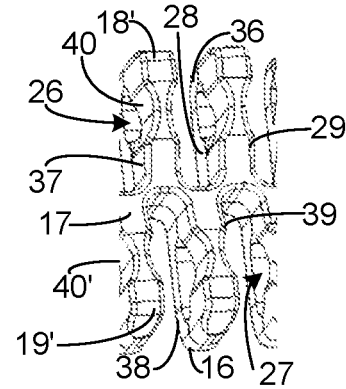
FIG. 1  FIG. 1A
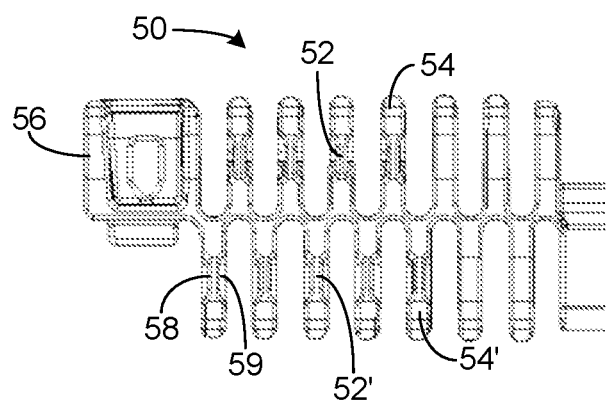
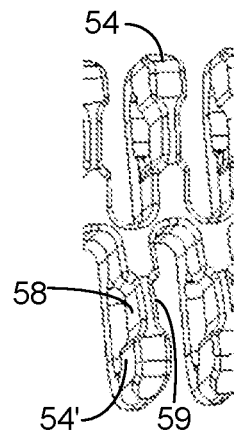
FIG. 2  FIG. 2A
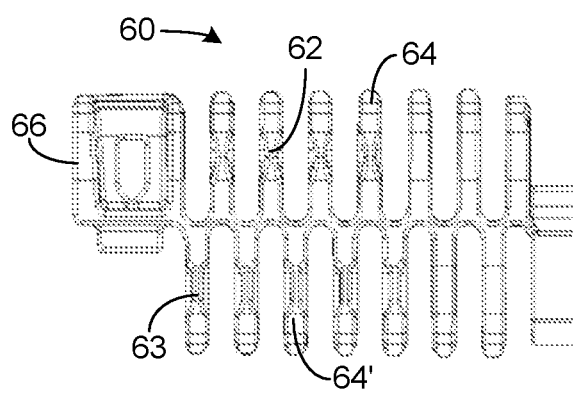
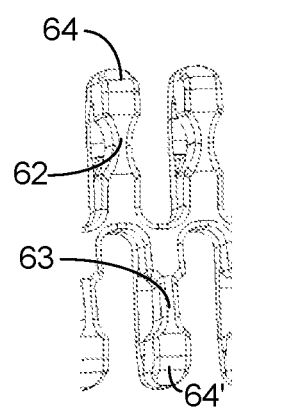
FIG. 3  FIG. 3A

CONVEYOR BELT AND MODULES

BACKGROUND

The invention relates generally to power-driven conveyors and more particularly to modular plastic conveyor belts and belt modules.

Modular plastic conveyor belts are constructed of a series of rows of one or more belt modules linked end to end by hinge rods through laterally aligned passageways of interleaved hinge elements of adjacent rows. The belts are positively driven by drive sprockets or drums along conveying paths that may include straight or curved segments, or both. Some conveying paths with curved segments require the belt to turn in only one direction. Others require the belt to negotiate both left and right turns. In turns the hinge elements closer to the radially outer edge of the belt bear the belt tension. When a plastic conveyor belt module is injection-molded, molten plastic in injected into a mold's cavity. The flow into the portions of the cavity forming the hinge elements bifurcates around a core pin forming the rod holes. A weld line forms in each hinge element where the bifurcated flows meet. If the hinge elements are designed to be symmetrical about a plane through the rod holes and parallel to the module's pull direction, the weld lines will often be formed between the rod holes and the ends of the hinge elements at or close to the pull line of the module when in a conveyor belt. Belt tension concentrated in the hinge elements around the weld lines often causes the module to break at one or more of the weld lines.

SUMMARY

One version of a conveyor belt module that extends in length from a first end to a second end, in width from a first side to a second side, and in thickness from a top to a bottom comprises an intermediate portion and a plurality of first and second hinge elements. The first hinge elements extend outward in a first length direction from the intermediate portion to a distal end at the first end of the conveyor belt module. Each has a first side wall and a second side wall and a first rod hole extending in a width direction from the first side wall to the second side wall. The second hinge elements extend outward in a second length direction opposite to the first length direction from the intermediate portion to a distal end at the second end of the conveyor belt module. Each has a first side wall and a second side wall and a second rod hole extending in the width direction from the first side wall to the second side wall. The first and second rod holes define a central plane that is parallel to the first and second length directions and to the width direction. The first and second side walls of at least some of the first hinge elements and the second hinge elements each define an upper region between the central plane and the top of the conveyor belt module and a lower region between the central plane and the bottom of the conveyor belt module. The first and second side walls are closer together in a narrowed portion of the lower region than in the upper region or else are closer together in a narrowed portion of the upper region than in the lower region.

Another version of a conveyor belt module that extends in length from a first end to a second end, in width from a first side to a second side, and in thickness from a top to a bottom comprises an intermediate portion and a plurality of first and second hinge elements. The first hinge elements extend outward in a first length direction from the intermediate portion to a distal end at the first end of the conveyor belt module. Each has a first rod hole extending in a width direction through the first hinge element. The second hinge elements extend outward in a second length direction opposite to the first length direction from the intermediate portion to a distal end at the second end of the conveyor belt module. Each has a second rod hole extending in the width direction through the first hinge element. The first and second rod holes define a central plane that is parallel to the first and second length directions and to the width direction and that separates the first and second hinge elements into an upper region above the central plane and a lower region below the central plane. The minimum cross section of the lower region in a plane perpendicular to the first and second length directions in some of the first and second hinge elements is less than the minimum cross section of the upper region, or vice versa.

BRIEF DESCRIPTION OF THE DRAWINGS

FIG. 1 is a bottom plan view of a portion of one version of a belt module for a modular plastic conveyor belt. FIG. 1A is an enlarged axonometric view of a portion of the belt module of FIG. 1.

FIG. 2 is a bottom plan view of a portion of a second version of a belt module for a modular plastic conveyor belt. FIG. 2A is an enlarged axonometric view of a portion of the belt module of FIG. 2.

FIG. 3 is a bottom plan view of a portion of a third version of a belt module for a modular plastic conveyor belt. FIG. 3A is an enlarged axonometric view of a portion of the belt module of FIG. 3.

DETAILED DESCRIPTION

Figure 5:
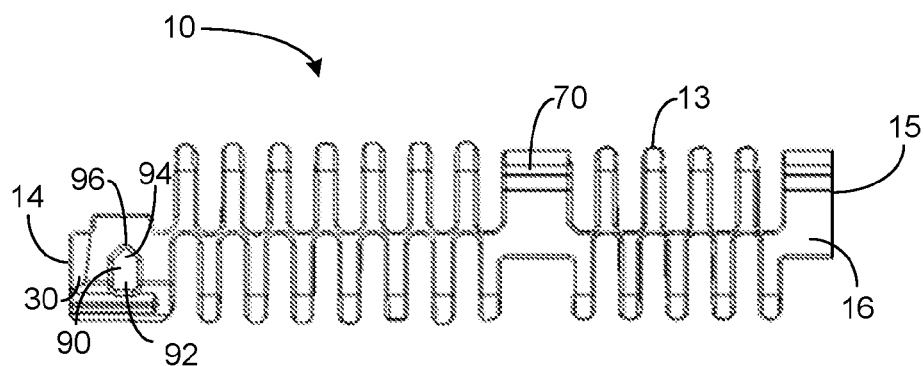
FIG. 5 is a top plan view of the complete belt module as in any of FIGS. 1-3.

One version of a conveyor belt module is shown in FIGS. 1 and 1A from the bottom side and in FIG. 5 from the top side. (FIG. 1 shows only a portion of the complete module of FIG. 5.) The module 10 extends in length from a first end 12 to an opposite second end 13, in width from a first side 14 to an opposite second side 15, and in thickness from a top 16 to a bottom 17. First hinge elements 18, 18' extend outward in a first length direction 20 from an intermediate portion 22 of the belt module 10 to distal ends. Second hinge elements 19, 19' extend outward from the intermediate portion 22 in an opposite second length direction 21 to distal ends. The first hinge elements 18, 18' are offset laterally in the width direction from the second hinge elements 19, 19'. Gaps 24 are formed between laterally adjacent hinge elements. First and second rod holes 26, 27 extend in the width direction through the first and second hinge elements 18, 18', 19, 19' from first side walls 28, 28' to second side walls 29, 29'. A wide edge portion 30 also has rod holes aligned with the rod holes 26 of the first hinge elements 18, 18'.

Figure 4:
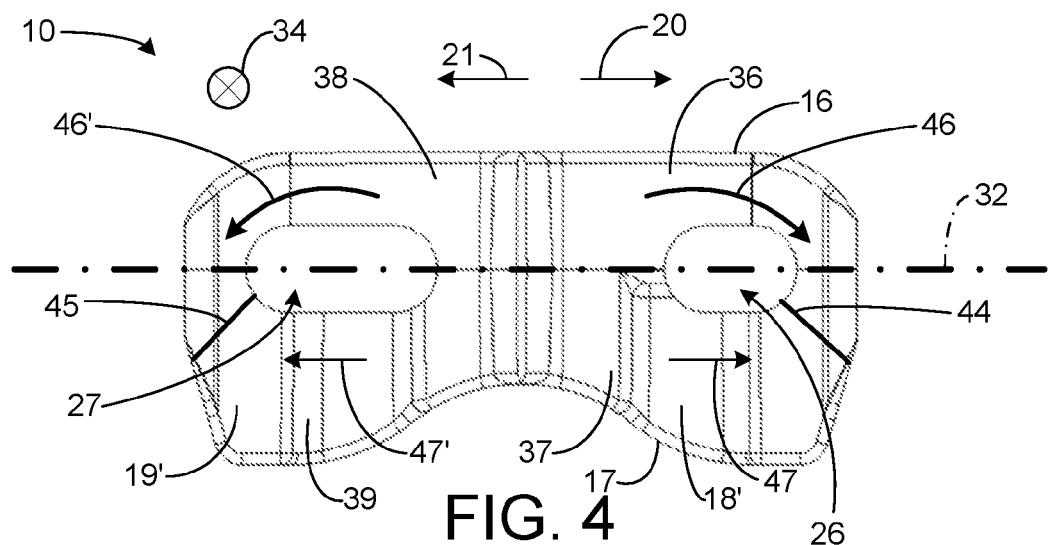
FIG. 4 is an enlarged side elevation view of a belt module as in any of FIGS. 1-3.

As shown in FIG. 4, the first and second rod holes 26, 27 define a central plane 32 that is parallel to the first and second length directions 20, 21 and to the width direction 34. The central plane 32 lies between the top 16 and bottom 17 of the module 10. In this example the rod holes 26, 27 are elongated in the length direction to allow a belt made of such modules to negotiate turns. The central plane 32 divides at least some 18' of the first hinge elements into an upper region 36 between the central plane 32 and the top 16 of the module 10 and a lower region 37 between the central plane and the bottom 17 of the module. Similarly, the central plane 32 divides at least some 19' of the second hinge elements into an upper region 38 and a lower region 39. As shown, the majority of the top 16 of the module 10 is flat, and the bottom 17 is flat below the rod holes 26, 27. The flats are joined by an inwardly curving portion of the bottom 17 that forms a concave lateral channel that extends across the width of the module 10 to enable a conveyor belt constructed of the modules to transition around small-diameter nosebars or nose rollers at the discharge ends of conveyors.

As shown in FIGS. 1 and 1A, the side walls 28, 29 of the first hinge elements 18' are closer together in a narrowed portion 40 of the lower region 37 than in the upper region 36. Similarly, the side walls 28', 29' of the second hinge elements 19' are closer together in a narrowed portion 40' of the lower region 39 than in the upper region 38. Because the narrowed portions 40, 40' are in the lower regions 37, 39, the molten plastic injected into the mold cavity forming the injection-molded belt module 10 flows outward around core pins inserted into the mold to form the rod holes 26, 27. The mold surfaces that form the narrowed portions 40, 40' bottleneck the flows 47, 47'. Thus, the flows 46, 46' through the less restricted mold-cavity regions above the core pins advance faster than the flows 47, 47' through the lower restricted regions forming the narrowed portions of the hinge elements 18', 19'. Consequently, the flow fronts advancing around the core pins meet and form weld lines 44, 45 between the rod holes 26, 27 and the outside of the hinge elements 18', 19' below the central plane 32. And the outside ends of the weld lines 44, 45 are positioned well off the pull line of the module 10, which coincides with the central plane 32, as shown in FIG. 4. Thus, a belt constructed of such modules 10 with weld lines angled away from the pull line in that way can withstand greater belt tension.

The hinge elements 18, 19, which are farther from first side edge 14 of the module 10 than the hinge elements 18', 19', do not have a narrowed portion because they form a belt's hinge elements that are distant from the outside of a turn and so do not individually have to bear as much belt tension as the hinge elements 18', 19' at the outside of the turn. And although the narrowed portions are shown only in the lower regions 37, 39 of the hinge elements 18', 19', they could alternatively be formed only on the upper regions 36, 38. Or the narrowed portions could be on the upper region of some hinge elements and on the lower region of others. In all cases, the restricted regions in the molds cause the formation of weld lines that angle outwardly from the rod holes upwardly or downwardly away from the pull lines.

The first side walls 28, 29 are shown in the example of FIG. 1 as mirror images of each other. Likewise, the second side walls 28', 29' are shown as mirror images of each other. But the narrowed portions could be formed in other ways as long as the result is a narrowed portion in the lower (or upper) region compared to the upper (or lower) region formed by a slower flow of plastic through a restricted region of the mold. In the version shown in FIGS. 1 and 1A, the side walls 28, 29, 28', 29' curve inward toward each other to a minimum spacing at a waist below the rod holes 26, 27, which gives the narrowed portions a varying cross section. Above the rod holes 26, 27, the first and second side walls are flat and do not curve inward. At the minimum spacing of the two conveying side walls 28, 29, 28', 29', the cross sections of the narrowed portions 40, 40' in a plane 42 perpendicular to the first and second length directions 20, 21 are a minimum cross section. The cross sections of the hinge elements 18', 19' at their distal ends and at their connections with the intermediate portion 22 are greater than in the narrowed portions for strength.

FIGS. 2 and 2A depict another version of a belt module that is similar to the belt module 10 of FIGS. 1 and 1A. The belt module 50 differs from the belt module 10 of FIG. 1 in the shape of the narrowed portions 52, 52' of the hinge elements 54, 54' closer to the outer side 56 of the module. In this version the side walls in the narrowed portions 52, 52' have flat faces 58, 59 defining the minimum spacing of the side walls at an extended waist. In FIGS. 3 and 3A, the belt module 60 has curved side walls 62 as in FIG. 1 on the first hinge elements 64 closer to outer side 66 and side walls 63 with flat faces as in FIG. 2 on the second hinge elements 64'.

The complete module 10 shown in FIG. 5 includes a wider interior hinge element 70 along the module's second end 13. The underside of the wider hinge element 70 includes a recessed pocket that receives the drive tooth of a drive sprocket to drive a belt constructed of such modules. The pocket also receives the teeth of idle sprockets on a conveyor.

Figure 6:
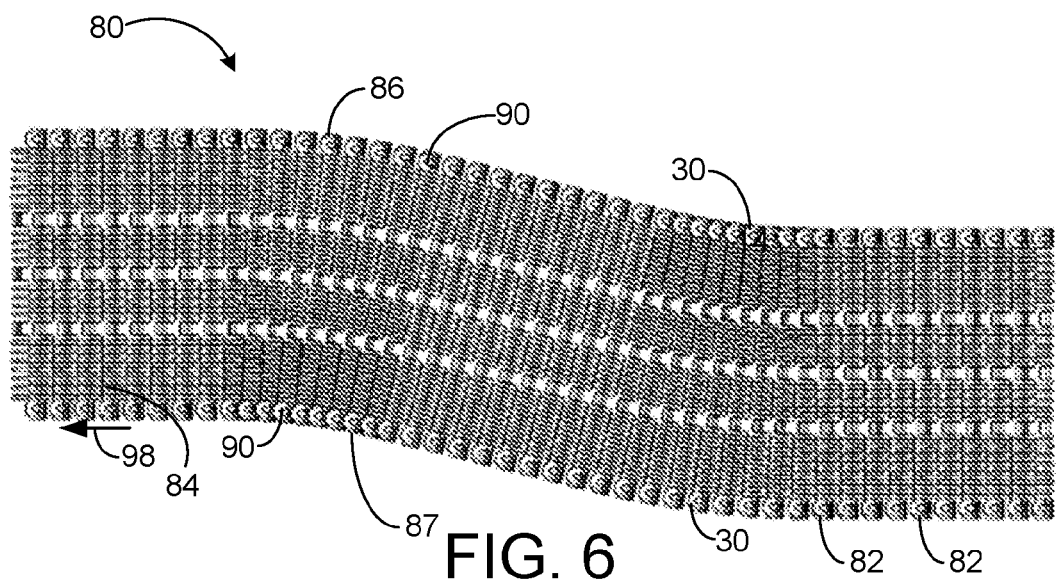
FIG. 6 is a top plan view of a portion of a modular plastic conveyor belt negotiating both left and right turns.

A portion of a conveyor belt 80 constructed of belt modules 10 is shown in FIG. 6 negotiating left and right turns. The belt 80 is constructed of a series of rows 82 of one or more belt modules joined by hinge rods (not shown) extending through lateral passageways formed by aligned rod holes of interleaved first and second hinge elements of adjacent rows 82 at hinge joints 84. With elongated rod holes as in FIG. 1A, which allow the belt to collapse at either side 86, 87, the belt 80 can make both left and right turns as well as run straight. If the belt is made in a bricklay pattern, each row 82 is constructed of two or more side-by-side modules separated at seams. Alternatively, the belt 80 can be constructed of rows 82 containing a single wide module that defines the width of the belt. The geometry of the belt modules provides no large openings through the belt 10 and so minimizes finger pinching.

As FIGS. 5 and 6 show, the edge portions 30 of the belt modules 10 each include an opening 90 in the top 16 that is shaped to indicate a direction. In this example the shape is a combination of a rectangular portion 92 and a triangular portion 94. The shape of the opening 90 indicates a direction pointed to by the vertex 96 of the triangular portion 94 that is opposite the rectangular portion 92. The direction indicated by the openings 90 indicates a direction of belt travel 98 of the conveyor belt 80 constructed of the modules 10. In other belt versions the openings can be used as an aid in the assembly of the conveyor belt 80 by prompting belt assemblers to install the modules 10 with the openings arranged in the same direction. Other shapes for the openings can be used to indicate a direction to show the direction of belt travel or to aid assembly. Some examples are lone triangles, chevrons, arrows, and arrowheads.

The design of the hinge elements with the narrowed portions provided by the converging side walls could be altered for different belt applications. For example, the narrowed portions could be formed on some or all the hinge elements with circular, rather than elongated, rod holes for straight-running belts. As another example, the hinge elements with the narrowed portions could be located on only one lateral side of belts designed to turn in only one direction. Or all the hinge elements could be formed with narrowed portions either above or below the rod holes.

What is claimed is:

1. A conveyor belt module extending in length from a first end to a second end, in width from a first side to a second side, and in thickness from a top to a bottom, the conveyor belt module comprising:
an intermediate portion;
a plurality of first hinge elements extending outward in a first length direction from the intermediate portion to a distal end at the first end of the conveyor belt module and each having a first side wall and a second side wall and a first rod hole extending in a width direction from the first side wall to the second side wall;
a plurality of second hinge elements extending outward in a second length direction opposite to the first length direction from the intermediate portion to a distal end at the second end of the conveyor belt module and each having a first side wall and a second side wall and a second rod hole extending in the width direction from the first side wall to the second side wall;
wherein the first and second rod holes each define a central plane parallel to the first and second length directions and to the width direction;
wherein the first and second side walls of at least some of the first hinge elements and the second hinge elements each define an upper region between the central plane and the top of the conveyor belt module and a lower region between the central plane and the bottom of the conveyor belt module;
wherein the first and second side walls are closer together in a narrowed portion of the lower region than in the upper region or else are closer together in a narrowed portion of the upper region than in the lower region;
wherein weld lines are formed in the upper or lower regions having the narrowed portion.

2. The conveyor belt module as claimed in claim 1 wherein the first and second hinge elements in which the first and second side walls are closer together in the narrowed portion are closer to the first side of the conveyor belt module than are the other first and second hinge elements.

3. The conveyor belt module as claimed in claim 1 wherein the first and second hinge elements in which the first and second side walls are closer together in the narrowed portion are closer to the first and second sides of the conveyor belt module than are the other first and second hinge elements.

4. The conveyor belt module as claimed in claim 1 wherein the first and second side walls are mirror images of each other.

5. The conveyor belt module as claimed in claim 1 wherein the rod holes are elongated in length and wherein the narrowed portion is either above or below the elongated rod hole.

6. The conveyor belt module as claimed in claim 1 wherein the first and second side walls in the narrowed portion of the first hinge elements are curved and wherein the first and second side walls of the second hinge elements have flat faces in the narrowed portion.

7. The conveyor belt module as claimed in claim 1 wherein the narrowed portion of the first hinge elements is in the upper region and the narrowed portion of the second hinge elements is in the lower region.

8. A conveyor belt comprising:
a series of rows of one or more conveyor belt modules including conveyor belt modules as claimed in claim 1;
a plurality of hinge rods extending through lateral passageways formed by the aligned first and second rods holes of the interleaved first and second hinge elements of the one or more conveyor belt modules of adjacent rows to join the rows together at hinge joints between adjacent rows.

9. A conveyor belt module extending in length from a first end to a second end, in width from a first side to a second side, and in thickness from a top to a bottom, the conveyor belt module comprising:
an intermediate portion;
a plurality of first hinge elements extending outward in a first length direction from the intermediate portion to a distal end at the first end of the conveyor belt module and each having a first rod hole extending in a width direction through the first hinge element;
a plurality of second hinge elements extending outward in a second length direction opposite to the first length direction from the intermediate portion to a distal end at the second end of the conveyor belt module and each having a second rod hole extending in the width direction through the second hinge element;
wherein the first and second rod holes each define a central plane parallel to the first and second length directions and to the width direction and separating the first and second hinge elements into an upper region above the central plane and a lower region below the central plane;
wherein the minimum cross section of the lower region in a plane perpendicular to the first and second length directions in some of the first and second hinge elements is less than the minimum cross section of the upper region, or vice versa;
wherein weld lines are formed in the upper or lower region having the lesser minimum cross section.

10. The conveyor belt module as claimed in claim 9 wherein the first and second rod holes are elongated in length and wherein the lesser minimum cross sections are either above or below the elongated first and second rod holes.

11. The conveyor belt module as claimed in claim 9 wherein the first and second hinge elements having the lesser minimum cross section in either the upper or lower region are closer to the first and second sides of the conveyor belt module than are the other first and second hinge elements.

12. The conveyor belt module as claimed in claim 9 wherein the first and second hinge elements have first and second side walls and wherein the first and second side walls in either the upper region or the lower region curve toward each other from opposite ends to a waist defining a minimum spacing of the first and second side walls.

13. The conveyor belt module as claimed in claim 12 wherein the first and second side walls are mirror images of each other.

14. A conveyor belt module comprising:
a first end and an opposite second end defining the length of the conveyor belt module;
a first side and an opposite second side defining the width of the conveyor belt module;
a top and a bottom defining the thickness of the conveyor belt module;
an outer edge portion at the first side including an opening having a shape that indicates a direction.

15. The conveyor belt module as claimed in claim 14 wherein the opening opens onto the top of the conveyor belt module.

16. The conveyor belt module as claimed in claim 14 wherein the opening has a shape having a rectangular portion and a triangular portion pointing in the direction.

17. The conveyor belt module as claimed in claim 14 wherein the direction indicated by the opening indicates a direction of belt travel of a conveyor belt in which the conveyor belt module is installed.

18. A conveyor belt constructed of conveyor belt modules as claimed in claim 14 such that the openings of all the conveyor belt modules when installed in the conveyor belt indicate the same direction.

* * * * *